(12) United States Patent
Shioiri et al.

(10) Patent No.: US 6,658,319 B2
(45) Date of Patent: Dec. 2, 2003

(54) MOLDING-CONDITION SETTING METHOD FOR AN INJECTION MOLDING MACHINE

(75) Inventors: Takayoshi Shioiri, Nagano (JP); Takashi Terashima, Nagano (JP); Eiki Iwashita, Nagano (JP); Yoshitoshi Yamagiwa, Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 0 days.

(21) Appl. No.: 10/166,077

(22) Filed: Jun. 11, 2002

(65) Prior Publication Data
US 2002/0188375 A1 Dec. 12, 2002

(30) Foreign Application Priority Data
Jun. 11, 2001 (JP) .................................. 2001-175353

(51) Int. Cl.[7] .............................................. B29C 45/77
(52) U.S. Cl. .................. 700/203; 700/200; 700/201; 264/40.1; 425/149
(58) Field of Search ............................. 700/200, 202, 700/203, 204, 205; 264/40.1; 425/149, 451.2

(56) References Cited
U.S. PATENT DOCUMENTS 5,350,546 A * 9/1994 Takeuchi et al. ............ 700/203
5,518,671 A * 5/1996 Takizawa et al. ........... 700/203
5,900,259 A * 5/1999 Miyoshi et al. ............. 425/149
6,051,170 A * 4/2000 Kamiguchi et al. ......... 700/200
6,546,311 B2 * 4/2003 Brown ....................... 700/200

FOREIGN PATENT DOCUMENTS

JP          8-230006          9/1996

* cited by examiner

Primary Examiner—Albert W. Paladini
(74) Attorney, Agent, or Firm—Birch, Stewart, Kolasch & Birch, LLP

(57) ABSTRACT

Molding conditions of an injection molding machine are set through performance of virtual molding by CAE. First, actual molding is performed under provisional molding conditions in order to obtain an actual profile showing variation in load pressure actually measured during at least an injection step of the actual molding. Further, virtual molding is performed by CAE under the provisional molding conditions in order to obtain a virtual profile showing variation in load pressure simulated during at least an injection step of the virtual molding. The provisional molding conditions are changed by CAE in such a manner that the virtual profile coincides with the actual profile, to thereby obtain intermediate molding conditions. Subsequently, the intermediate molding conditions are optimized so as to obtain molding conditions for the injection molding machine.

14 Claims, 3 Drawing Sheets

MOLDING-CONDITION SETTING METHOD FOR AN INJECTION MOLDING MACHINE

BACKGROUND OF THE INVENTION

1. Field of the Invention

The present invention relates to a molding-condition setting method for an injection molding machine, which method is suitable for use in the case where molding conditions are set by means of CAE (computer aided engineering).

2. Description of the Relevant Art

In general, setting of molding conditions in an injection molding machine requires a large number of trial molding operations and a long setting time, because the setting work greatly depends on the know-how and experience of an operator, and various physical values affect one another. Therefore, conventionally, virtual molding (simulation) has been performed by use of CAE for injection molding, and molding conditions have been set on the basis of the virtual molding, as disclosed in, for example, Japanese Patent Application Laid-Open (kokai) No. 8(1996)-230006.

In virtual molding by use of CAE, phenomena occurring within a mold within a short period of time; i.e., the result of simulation on resin temperature, pressure, shear rate, etc. can be reflected in molded products. Therefore, if phenomena occurring within a mold can be grasped accurately, use of CAE enables optimization of molding conditions and stable molding of non-defective products. As described above, since CAE can calculate all phenomena occurring within a mold, if analysis accuracy is high, CAE serves as an assisting apparatus suitable for optimization of molding conditions.

However, when a conventional CAE system is used in actual molding, many problems arise. For example, in virtual molding by use of CAE, the results of simulation on phenomena which occur within a mold within a short period of time can be reflected in molded products. However, since molding conditions during actual molding do not coincide with the molding conditions determined by CAE, a large analysis error is produced. In practice, the results of actual molding greatly differ from the results of virtual molding. Therefore, the conventional molding-condition setting method utilizing CAE cannot set optimal molding conditions efficiently and with ease and cannot utilize CAE sufficiently.

SUMMARY OF THE INVENTION

An object of the present invention is to provide a molding-condition setting method for an injection molding machine which can solve the problem that the results of actual molding greatly differ from the results of virtual molding, and eliminate analytical errors to thereby enable efficient, easy setting of optimal molding conditions.

Another object of the present invention is to provide a molding-condition setting method for an injection molding machine which attains the most preferable results in setting accuracy, setting efficiency, etc.

In order to achieve the object as described above, the present invention provides a method for setting molding conditions of an injection molding machine through performance of virtual molding by CAE, the method comprising the steps of: setting provisional molding conditions for the injection molding machine and performing actual molding; obtaining an actual profile showing variation in load pressure actually measured during at least an injection step of the actual molding; performing virtual molding by means of the CAE while using the provisional molding conditions; obtaining a virtual profile showing variation in load pressure simulated during at least an injection step of the virtual molding; changing the provisional molding conditions by means of the CAE in such a manner that the virtual profile coincides with the actual profile, to thereby obtain intermediate molding conditions; and optimizing the intermediate molding conditions so as to obtain molding conditions for the injection molding machine.

Preferably, a flow-front position in the virtual molding performed by use of the CAE is determined, a gate position is obtained from the actual profile, and load pressure after the gate position is used.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

First, with reference to FIG. 2, there will be described the configuration of a molding-condition setting system S, which can perform a molding-condition setting method according to the present embodiment for an injection molding machine M.

Figure 2:
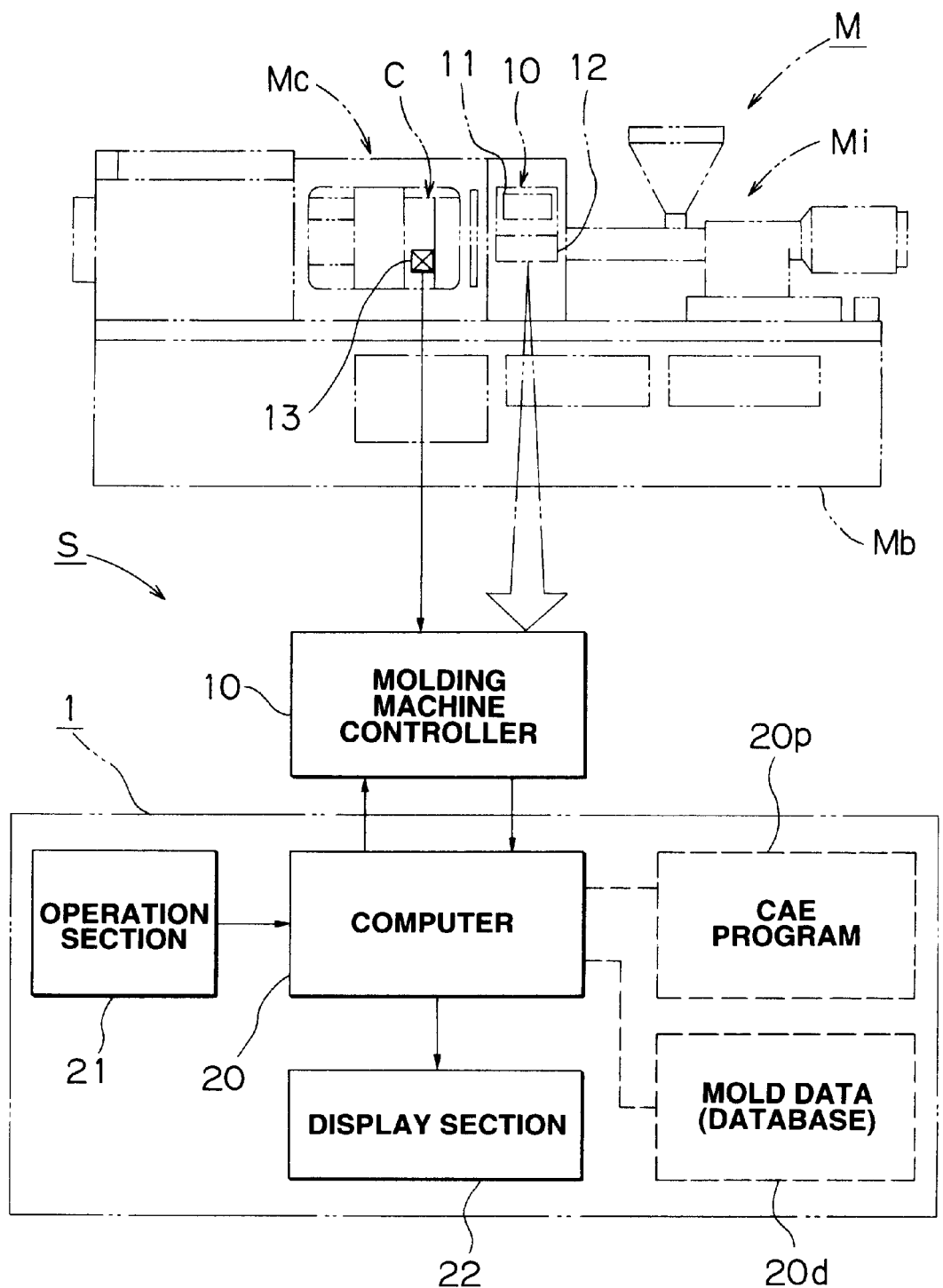
FIG. 2 is a block diagram of a molding-condition setting system which can perform the molding-condition setting method.

An injection molding machine M indicated by an imaginary line in FIG. 2 includes an injection apparatus Mi disposed on a machine base Mb, and a mold clamping apparatus Mc, to which a mold C is attached. Further, a molding machine controller 10 is disposed on the machine base Mb. The molding machine controller 10 includes a display 11 and an operation panel 12. Reference numeral 13 denotes a pressure sensor for detecting charging pressure (load pressure) of molten resin changed into the mold C. A detection signal output from the pressure sensor 13 is fed to the molding machine controller 10.

Reference numeral 1 denotes a CAE system which can perform CAE for injection molding. Notably, the CAE system 1 of the present embodiment includes a CAD/CAM system. The CAE system 1 includes a computer 20; an operation section 21 connected to the computer 20 and including at least a keyboard and a mouse; and a display 22 connected to the computer 20. The computer 20 stores a CAE program 20p including software for virtual molding, and has a database 20d in which mold-shape data and other data are registered. The computer 20 can perform data exchange; i.e., two-way data communications, with the molding machine controller 10.

Figure 1:
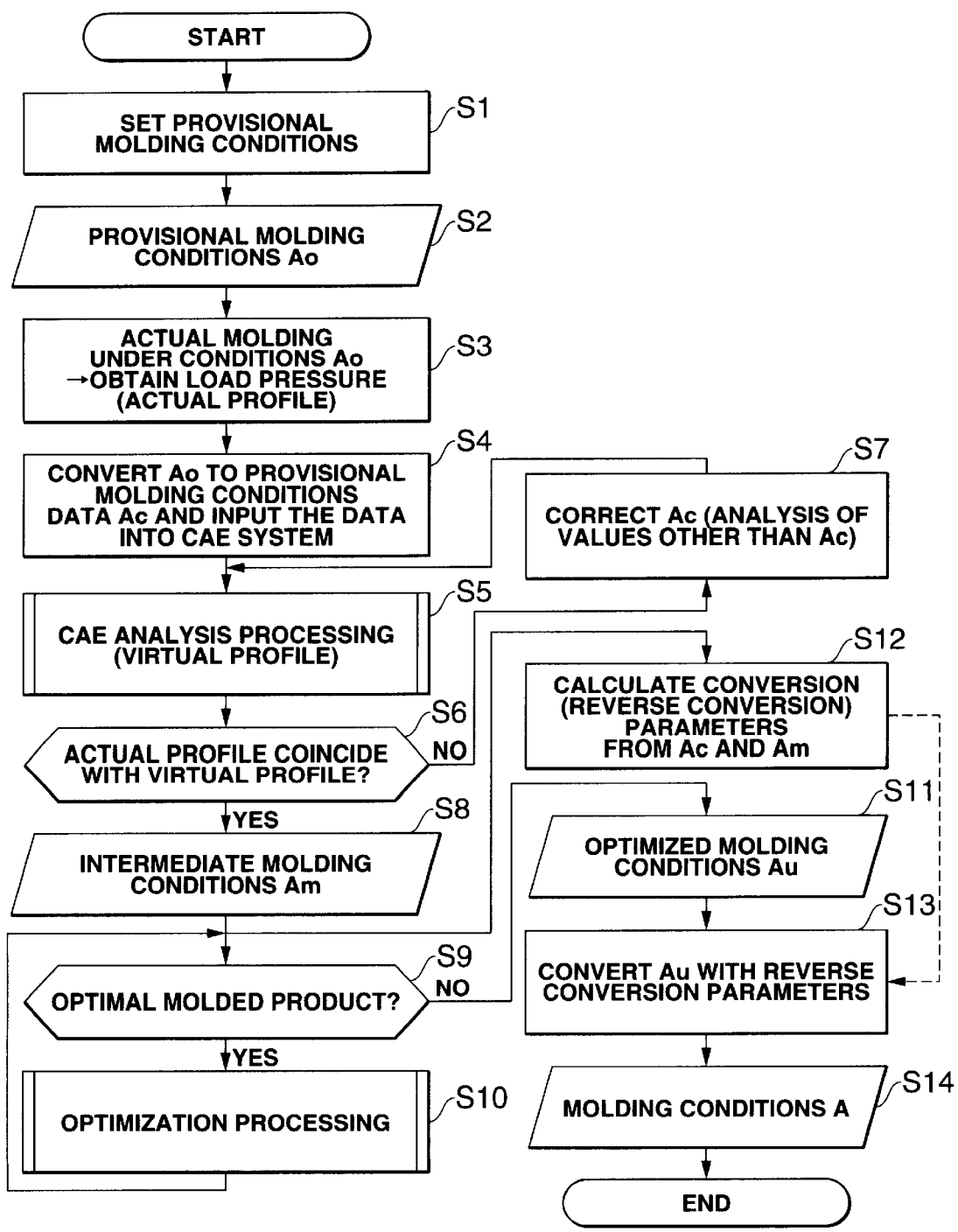
FIG. 1 is a flowchart showing the steps of a molding-condition setting method for an injection molding machine according to an embodiment of the present invention.
Figure 3:
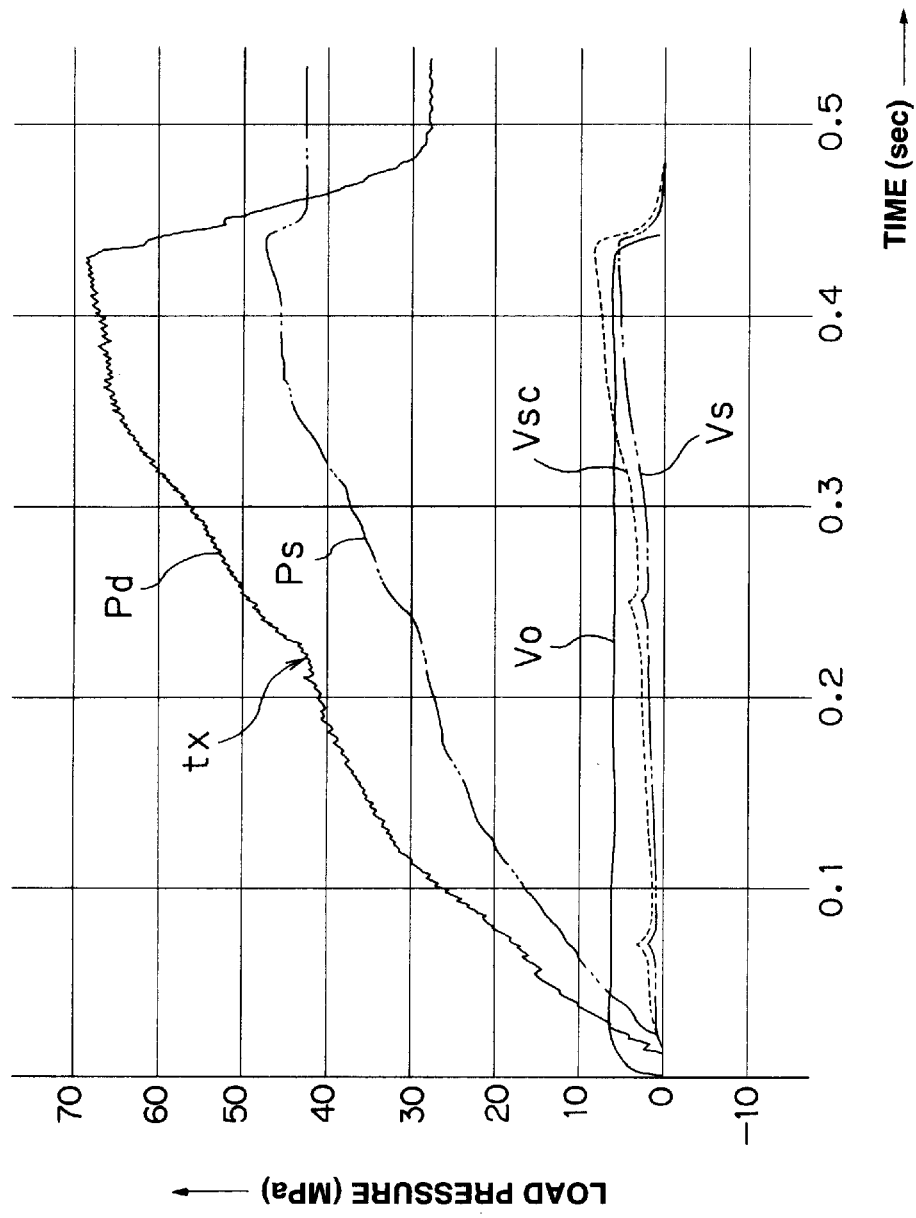
FIG. 3 is a graph displayed on a display section of the molding-condition setting system.

Next, the molding-condition setting method according to the present embodiment performed by use of the system S will be described in accordance with the flowchart shown in FIG. 1 and with reference to FIGS. 2 and 3.

First, provisional molding conditions are set for the injection molding machine M (steps S1 and S2). In the case in which mold-shape data are held in the database 20d of the CAD/CAM system, standard provisional molding conditions Ao are set on the basis of the mold-shape data. Meanwhile, in the case in which mold-shape data are not held in the database 20d, provisional molding conditions Ao are set upon performance of a trial injection for actually charging resin into the mold. In either case, injection can be performed at one (constant) injection speed Vo, as shown in FIG. 3.

Subsequently, the injection molding machine M is caused to perform actual molding under the provisional molding conditions Ao, and an actual profile Pd is obtained (step S3). The actual profile Pd shows variation in load pressure actually measured during at least an injection step of the actual molding. In the present embodiment, load pressure data obtained from the pressure sensor 13 are continuously acquired during the injection step. In the present embodiment, pressure within the mold detected by the pressure sensor 13 is used as a load pressure. However, injection pressure or nozzle pressure may be used as a load pressure. FIG. 3 shows the thus-obtained actual profile Pd. Subsequently, data representing the actual profile Pd and the provisional molding conditions Ao are transmitted to the computer 20 of the CAE system 1 (step S4). At this time, the data representing the actual profile Pd and the provisional molding conditions Ao are automatically converted to provisional molding conditions data Ac which the CAE program 20p can use.

Meanwhile, the CAE system 1 performs virtual molding (simulation) while using the provisional molding conditions data Ac. As a result, the CAE system 1 can obtain a virtual profile Ps, which shows variation in load pressure simulated during an injection step of the virtual molding. The thus-obtained virtual profile Ps is displayed on the display section 22 in such a manner that the actual profile Pd and the virtual profile Ps are superposed on each other. FIG. 3 shows the display section 22 on which the actual profile Pd and the virtual profile Ps are displayed. Subsequently, the operator operates the operation section 12 so as to correct the provisional molding conditions data Ac in such a manner that the virtual profile Ps displayed on the display section 22 coincides with the actual profile Pd (steps S5, S6, and S7). In FIG. 3, reference letter Vs represents injection speed at the time when the virtual profile Ps was obtained, and reference letter Vsc represents injection speed at the time when the corrected provisional molding conditions data Ac were obtained. Notably, the injection speed Vs is determined on the basis of the conditions set by the CAE program 20p and does not coincide with the injection speed Vo.

Meanwhile, in the present embodiment, an important task is to choose a portion of the virtual profile Ps which is caused to coincide with a corresponding portion of the accrual profile Pd. The flow-front position in the virtual molding performed by CAE is determined or confirmed; and a gate position tx (FIG. 3) is determined from a variation point produced in the actual profile Pd. The virtual profile Ps is desirably caused to coincide with the actual profile Pd after the gate position tx. This enables obtainment of the most preferable results in setting accuracy, setting efficiency, etc. Since the provisional molding conditions data Ac have been corrected in such a manner that the virtual profile Ps coincides with the actual profile Pd, the corrected provisional molding conditions data Ac are stored as intermediate mold conditions Am (step S8). Notably, the intermediate mold conditions Am include not only items in relation to the provisional molding conditions data Ac but also the analytical results of other physical values such as temperature distribution, which can be obtained simultaneously.

Since the intermediate mold conditions Am are apparent optimal molding conditions, the temperature distribution and other physical values may assume a drastically undulating profile. Therefore, virtual molding is performed again in order to optimize (e.g., flatten) the temperature distribution and pressure distribution (steps S9 and S10). As a result, the intermediate mold conditions Am are corrected to optimized molding conditions Au for obtaining optimal molded products (step S11).

Meanwhile, since the above-described intermediate mold conditions Am can be obtained from the provisional molding conditions data Ac converted from the provisional molding conditions Ao, during this operation, conversion parameters used for converting the provisional molding conditions data Ac (the provisional molding conditions Ao) to the intermediate mold conditions Am are obtained, and reverse-conversion parameters are obtained from the conversion parameters (step S12). Subsequently, the optimized molding conditions Au are converted by use of the reverse-conversion parameters in order to obtain molding conditions A to be set for the injection molding machine M (steps S13 and S14). The molding conditions A set for the injection molding machine M can be used as regular molding conditions A without modification or after being corrected slightly.

In the molding condition setting method for the injection molding machine M according to the present embodiment, the CAE analysis is performed on the basis of the virtual profile Ps, which is obtained by correcting the actual profile Pd of the load pressure Pd during molding performed under the provisional molding conditions Ao. Therefore, the problem that the results of actual molding greatly differ from the results of virtual molding can be solved. As a result, analytical errors can be eliminated, and thus, optimal molding conditions can be set efficiently and easily. In particular, the optimized molding conditions Au are obtained through optimization of the intermediate mold conditions Am; conversion parameters used for converting the provisional molding conditions Ao (the provisional molding conditions data Ac) to the intermediate mold conditions Am are obtained; and the optimized molding conditions Au are converted by use of reverse-conversion parameters, which are obtained from the conversion parameters, to thereby set the molding conditions A. Therefore, the setting operation can be further facilitated.

While the present invention has been described with reference to the preferred embodiment, the present invention is not limited thereto. Regarding structural details and methods among others, modifications and any omission or addition may be possible as needed without departing from the scope of the invention.

What is claimed is:

1. A method for setting molding conditions of an injection molding machine through performance of virtual molding by CAE (computer aided engineering), the method comprising the steps of:

setting provisional molding conditions for the injection molding machine and performing actual molding;

obtaining an actual profile showing variation in load pressure actually measured during at least an injection step of the actual molding;

performing virtual molding by means of the CAE while using the provisional molding conditions;

obtaining a virtual profile showing variation in load pressure simulated during at least an injection step of the virtual molding;

changing the provisional molding conditions by means of the CAE in such a manner that the virtual profile coincides with the actual profile, to thereby obtain intermediate molding conditions; and optimizing the intermediate molding conditions so as to obtain molding conditions for the injection molding machine.

2. A method for setting molding conditions of an injection molding machine according to claim 1, wherein the provisional molding conditions are set on the basis of mold-shape data stored in a database of a CAD/CAM system.

3. A method for setting molding conditions of an injection molding machine according to claim 2, wherein the provisional molding conditions are set in such a manner that injection is performed at one speed.

4. A method for setting molding conditions of an injection molding machine according to claim 1, wherein the provisional molding conditions are set on the basis of data obtained through actual charging of resin into a mold.

5. A method for setting molding conditions of an injection molding machine according to claim 4, wherein the provisional molding conditions are set in such a manner that injection is performed at one speed.

6. A method for setting molding conditions of an injection molding machine according to claim 1, wherein the actual profile is obtained by performing an injection step and continuously sampling load-pressure data output from a pressure sensor.

7. A method for setting molding conditions of an injection molding machine according to claim 1, wherein data regarding the actual profile and the provisional molding conditions are automatically converted to provisional molding conditions data which can be used by a CAE program, and the provisional molding conditions data are transferred to a computer of a CAE system.

8. A method for setting molding conditions of an injection molding machine according to claim 1, wherein the virtual profile and the actual profile are displayed on a display section in such a manner that the virtual profile and the actual profile are superposed on each other.

9. A method for setting molding conditions of an injection molding machine according to claim 1, wherein the intermediate molding conditions include analytic results other than the provisional molding conditions.

10. A method for setting molding conditions of an injection molding machine according to claim 1, wherein the intermediate mold conditions are optimized in order to obtain optimized molding conditions; conversion parameters used for converting the provisional molding conditions data to the intermediate molding conditions; and the optimized molding conditions are converted by use of reverse-conversion parameters obtained from the conversion parameters, to thereby obtain the molding conditions.

11. A method for setting molding conditions of an injection molding machine according to claim 1, wherein injection pressure is used as the load pressure.

12. A method for setting molding conditions of an injection molding machine according to claim 1, wherein nozzle pressure is used as the load pressure.

13. A method for setting molding conditions of an injection molding machine according to claim 1, wherein mold internal pressure is used as the load pressure.

14. A method for setting molding conditions of an injection molding machine according to claim 1, wherein a flow-front position in the virtual molding performed by use of the CAE is determined, a gate position is obtained from the actual profile, and load pressure after the gate position is used.

* * * * *